(12) United States Patent
Tkabladze et al.

(10) Patent No.: US 10,281,610 B2
(45) Date of Patent: May 7, 2019

(54) FORMATION DENSITY TOOL WITH A DETECTOR OPERATING IN TOTAL COUNT MODE

(71) Applicant: SCHLUMBERGER TECHNOLOGY CORPORATION, Sugar Land, TX (US)

(72) Inventors: Avtandil Tkabladze, Sugar Land, TX (US); Sicco Beekman, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/166,428

(22) Filed: May 27, 2016

(65) Prior Publication Data
US 2017/0343700 A1  Nov. 30, 2017

(51) Int. Cl.
*G01V 5/12* (2006.01)
(52) U.S. Cl.
CPC ..................... *G01V 5/12* (2013.01)
(58) Field of Classification Search
CPC ......................................................... G01V 5/08
See application file for complete search history.

(56) References Cited

U.S. PATENT DOCUMENTS

| 5,600,135 | A | * | 2/1997 | Jacobson | G01T 1/40 250/261 |
| 7,960,687 | B1 | * | 6/2011 | Simon | G01V 5/125 250/269.1 |
| 8,173,953 | B2 | | 5/2012 | Stoller et al. | |
| 2008/0083872 | A1 | * | 4/2008 | Huiszoon | G01V 5/125 250/269.3 |
| 2011/0307179 | A1 | * | 12/2011 | Zhou | G01V 5/125 702/8 |
| 2014/0145072 | A1 | * | 5/2014 | Adolph | G01T 1/40 250/261 |

* cited by examiner

*Primary Examiner* — Hugh H Maupin
(74) *Attorney, Agent, or Firm* — Michael Dae

(57) ABSTRACT

A system includes a data processing system including a processor operatively coupled to a memory. The processor is configured to receive a first dataset indicative of spectral information regarding photons received from a first detector of a formation density tool. The processor is configured to receive a second dataset indicative of a total count rate of photons from a second detector of the formation density tool. The processor is configured to determine physical characteristics of a geological formation based on the spectral information and the total count rate. The processor is configured to display the physical characteristics of the geological formation in a display.

20 Claims, 5 Drawing Sheets

FORMATION DENSITY TOOL WITH A DETECTOR OPERATING IN TOTAL COUNT MODE

BACKGROUND

This disclosure relates generally to the usage of radiation detectors and gamma-ray detectors in a downhole tool and, more particularly, to pulse counting for a formation density tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of any kind.

To locate and extract oil, water, natural gas, or other liquids, a hole, referred to as a borehole, may be drilled into a surface of a geological formation. To form the borehole, a drill bit may excavate a portion of the geological formation. A drilling fluid, commonly referred to as "mud" or "drilling mud," may be pumped into the borehole, for example, to cool and/or lubricate the drill bit. Generally, the drilling mud may include solid particles, such as dirt, suspended in liquid, such as water. When the geological formation is porous, the liquid component of the drilling mud may be pushed into the geological formation, leaving the solid particles on the borehole wall. Over time, a layer of the solid particles, commonly referred to as "mud cake," may form along the wall of the borehole.

A formation density tool may be deployed sub-surface to measure physical properties of a surrounding geological formation. The formation density tool may be moved within a borehole drilled in the geological formation. For example, the formation density tool may be pushed to move the formation density tool farther into the borehole and/or pulled to remove the formation density tool from the borehole. The formation density tool may include a source to emit high-energy photons into the geological formation. Some of the high-energy photons may interact with the geological formation and may then be detected by one or more detectors in the formation density tool. The physical properties of the geological formation may be determined from the characteristics of the detected high-energy photons.

As the formation density tool is used to measure physical properties of the geological formation, an energy spectrum of the signal of the high-energy photons detected by a detector may be distorted for a variety of reasons, such as a change in temperature at the detector, a change in voltage on the detector, or the like. Radioactive stabilization sources may be used to determine such changes in the spectral response of the formation density tool. A process referred to as gain regulation may be used to account for such changes (e.g., to account for the changes in temperature, changes in voltages, etc.). In some cases, such determination may be used to adjust energy scale and spectral binning without attempting to adjust system gain. Radioactive stabilization sources may emit photons of specific energy that do not interfere unduly with the measured energy spectrum from the high-energy photons. However, the use of radioactive materials may be heavily regulated, thereby causing a burden to deploy such sources in a formation density tool.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented below is intended to familiarize the reader with certain aspects and contexts of embodiments of the present disclosure without limitation to the claimed subject matter.

In some embodiments, there is disclosed a well logging system comprising a processor operatively coupled to a memory. The processor is configured to receive a first dataset indicative of spectral information regarding photons received from a first detector of a formation density tool; receive a second dataset indicative of a total count rate of photons from a second detector of the formation density tool; and determine physical characteristics of a geological formation based on the spectral information and the total count rate.

In some embodiments, a system is provided that comprises a formation density tool configured to detect photons output by a photon source, where the detected photons are used to determine physical characteristics of a geological formation. The formation density tool may comprise a first detector configured to acquire spectral information of a first portion of the photons received by the first detector; and a second detector configured to provide a total count rate of a second portion of the photons received by the second detector.

In some embodiments, a method is disclosed that comprises receiving, via a processor, spectral information regarding photons received from a first detector of a formation density tool; receiving, via the processor, a total count rate of photons detected by a second detector of the formation density tool; and determining, via the processor, physical characteristics of a geological formation based on the spectral information and the total count rate.

BRIEF DESCRIPTION OF THE DRAWINGS

Various aspects of this disclosure may be better understood upon reading the following detailed description and upon reference to the drawings in which.

DETAILED DESCRIPTION

Figure 1:
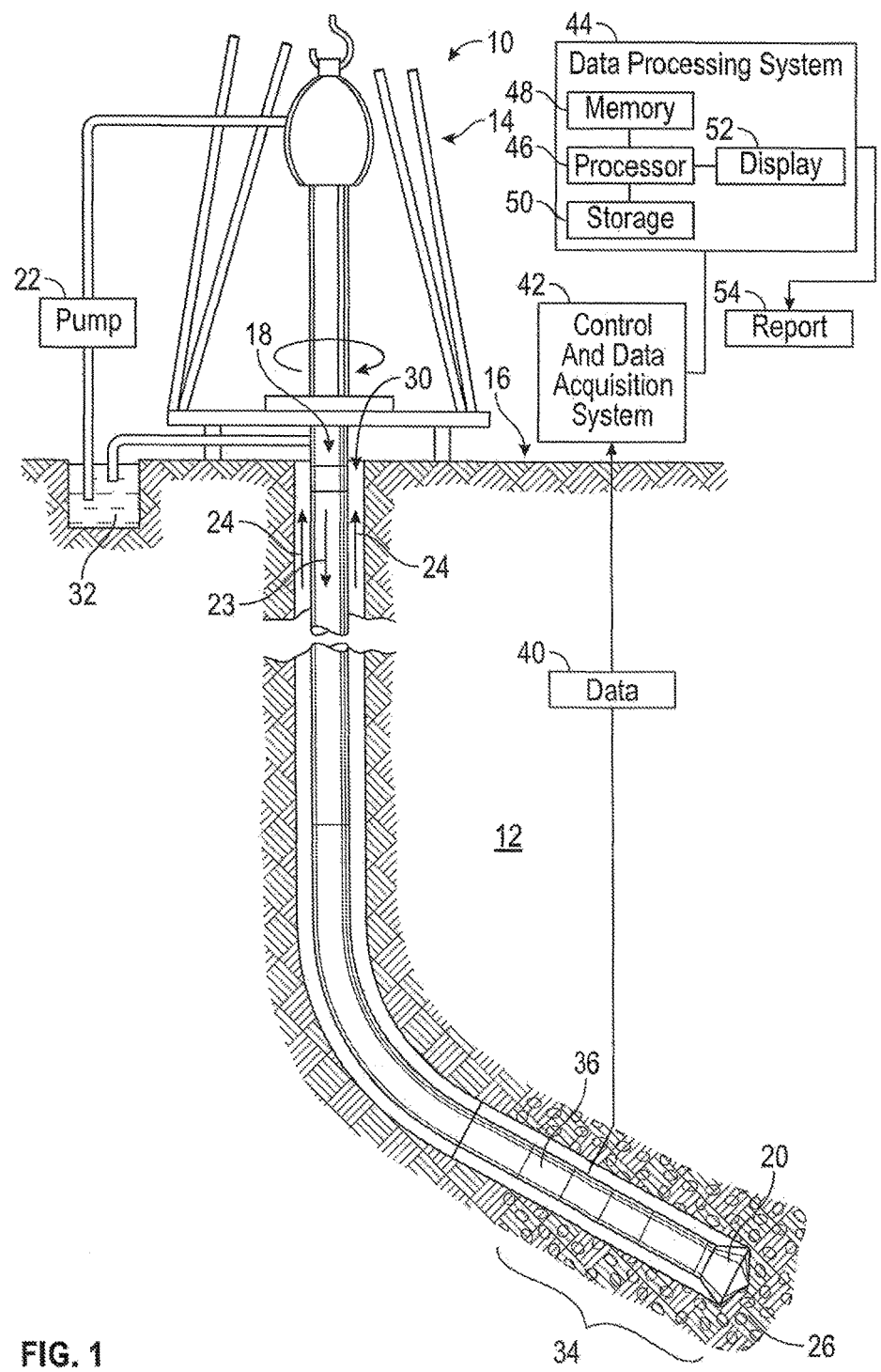
FIG. 1 is a schematic diagram of a drilling system that includes a system to detect characteristics of a geological formation adjacent to the formation density tool, in accordance with an embodiment.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One embodiment of the present disclosure is related to a formation density tool that has a first detector for providing spectral information and a second detector for providing a total count rate. Spectral information may include information regarding a spectrum of energy levels of photons received by the first detector. The total count rate may be a count per second of photons received by the second detector. As will be appreciated, while two detectors are used in examples described below, two or more detectors may be used in any suitable configuration. To determine physical properties of a geological formation, formation detection tools may correct for a photoelectric effect (PEF) caused by the geological formation, mud and/or mud cake of a borehole. In a cased hole, the casing and cement may also impact the photoelectric effect. The PEF may cause the density of the geological formation detected by the formation density tool to depend on the lithology of the formation and/or borehole, where the borehole may be an open hole or a cased hole. A formation density tool may include a detector that provides spectral information, such as information sensitive to the lithology of the formation and composition of borehole fluid and/or mud cake, to correct for the photoelectric effect (PEF). That is, by accounting for lithology, the formation density tool may provide an accurate, lithology independent, formation density. A distortion of the energy spectra (e.g., caused by changes in detected temperature) may change window counts and introduce errors to the measured density or PEF.

In some embodiments, to properly correct for PEF, these density tools that provide spectral information may calibrate the energy spectrum using a radioactive source. Where the calibration can be used to re-bin the histogram to retain the proper energy scale, i.e. to assure that for every bin in the histogram the associated deposited photon energy is known. In some embodiments, the information on the energy to bin association in the photon spectrum may be used to adjust the gain of the system to insure that a predetermined energy-to-channel relationship is maintained. In some cases, an advanced approach may be used wherein the gain is adjusted to insure proper alignment of the gain for a given energy. In addition, there may be a re-binning of the histogram to account for changes in spectral linearity. The radioactive source may emit a specific energy of photons that is known and does not unduly interfere with the measured spectrum. It is desirable to create a formation density tool that is sourceless (e.g., without the radioactive stabilization source (e.g., $^{137}Cs$)). Reducing or eliminating the use of the radioactive source may be beneficial for logistics and reduced documentation. As such, the formation density tool may include at least a first detector that provides spectral information and a second detector that provides a total count rate of photons received by the second detector. By having at least one of each detector, the formation density tool may determine physical characteristics of a geological formation while reducing the use of gain regulation from a stabilization source that uses radioactive materials. In some embodiments, the radioactive gain regulation sources may be eliminated completely. This is particularly the case when other methods of gain regulation are used for the spectral detector (see e.g. U.S. Pat. No. 8,173,953 assigned to Schlumberger, which is incorporated by reference into the current application in its entirety). While some embodiments described below may determine physical characteristics of a geological formation without such a stabilization source, other embodiments may include such stabilization sources (e.g., to improve accuracy).

With this in mind, FIG. 1 illustrates a drilling system 10 that may be used to drill a borehole into a geological formation 12. A drilling rig 14 at a surface 16 may rotate a drill string 18 having a drill bit 20 at its lower end. As the drill bit 20 is rotated, a drilling fluid pump 22 is used to pump drilling fluid 23, commonly referred to as "mud" or "drilling mud," downward through the center of the drill string 18 in the direction of the arrow to the drill bit 20. The drilling fluid 23, which is used to cool and lubricate the drill bit 20, exits the drill string 18 through the drill bit 20. The drilling fluid 23 then carries drill cuttings away from the bottom of a wellbore 26 as it flows back to the surface 16, as shown by the arrows through an annulus 30 between the drill string 18 and the geological formation 12. However, as described above, as the drilling fluid 23 flows through the annulus 30 between the drill string 18 and the geological formation 12, the drilling fluid 23 may invade and mix with fluids stored in the geological formation 12, which may be referred to as formation fluid (e.g., natural gas or oil). At the surface 16, return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools, such as a formation density tool 36. Downhole tools may collect a variety of information relating to the geological formation 12 and/or the state of drilling of the well. For instance, a measurement-while-drilling (MWD) tool may measure certain drilling parameters, such as the temperature, pressure, orientation of the drilling tool, and so forth. Likewise, a logging-while-drilling (LWD) tool may measure the physical characteristics of the geological formation 12, such as density, porosity, resistivity, lithology, and so forth. As described in detail below, the formation density tool 36 may detect physical characteristics of the geological formation 12. It should be noted that although FIG. 1 only illustrates an embodiment where the formation density tool 36 is conveyed by a drill string 18 to the geological formation 12, other apparatuses, methods and/or systems can be used to convey the formation density tool 36 to the geological formation 12 as well. Such apparatuses, methods and/or systems include, but are not limited to, an electric and/or fiber optic cable (e.g. wireline), a slickline cable, a wired conveyance rod, a coiled tubing string, a coiled tubing drilling (CTD) system, a wired coiled tubing string, etc., as can be readily appreciated by people skilled in the art. All such embodiments and variations are considered within the scope of the current disclosure.

The formation density tool 36 may transmit the measurements taken as data 40 that may be stored and processed in the BHA 34 or, as illustrated in FIG. 1, may be sent to the surface 16 for processing. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the return drilling fluid 24. In another example, the data 40 may be stored in the formation density tool 36 and retrieved directly from the formation density tool 36 upon return to the surface 16.

The data processing system 44 may include a processor 46, memory 48, storage 50, and/or a display 52. The data processing system 44 may use the data 40 to determine various properties of the geological formation 12 adjacent to the borehole using any suitable techniques. To process the data 40, the processor 46 may execute instructions stored in the memory 48 and/or the storage 50. As such, the memory 48 and/or the storage 50 of the data processing system 44 may be any suitable article of manufacture that can store the instructions. The memory 48 and/or the storage 50 may be read-only memory (ROM) memory, random-access memory (RAM), flash memory, an optical storage medium, or a hard disk drive, to name a few examples. The display 52 may be any suitable electronic display that can display the logs and/or other information relating to properties of the borehole as measured by the formation density tool 36. It should be appreciated that, although the data processing system 44 is shown by way of example as being located at the surface 16, the data processing system 44 may be located in the BHA 34. In such embodiments, some of the data 40 may be processed and stored downhole, while some of the data 40 may be sent to the surface 16 in real time. This may be the case particularly in LWD, where a limited amount of the data 40 may be transmitted to the surface 16 during drilling or reaming operations. The data processing system 44 may generate a report 54 based on the data 40 of the geological formation 12 to enable operators to control drilling operations based on the physical properties of the geological formation.

Figure 2:
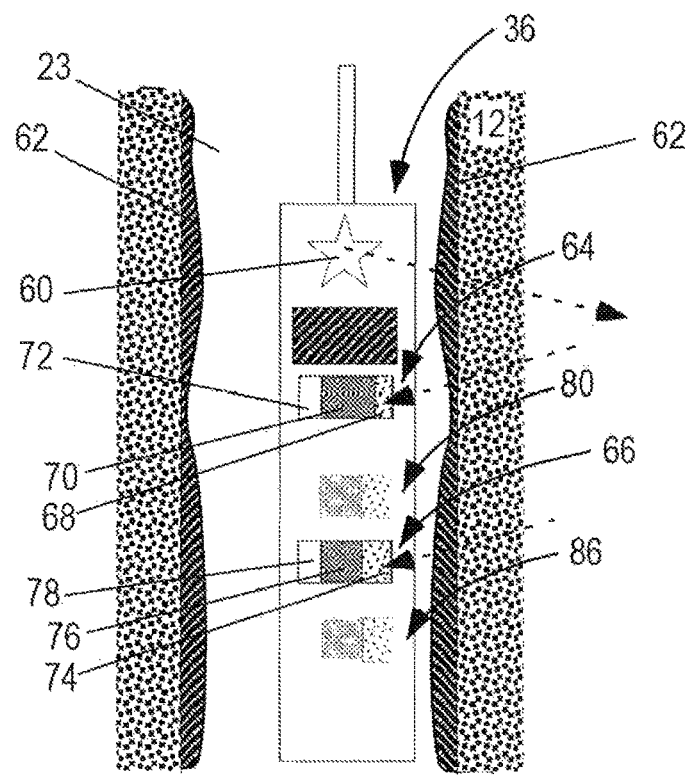
FIG. 2 is a schematic diagram of the formation detection system of FIG. 1 having a first detector configured to detect spectral information and a second detector configured to detect a total count rate, in accordance with an embodiment.

FIG. 2 is a schematic diagram of the formation density tool 36 configured to detect physical characteristics of the geological formation 12. The formation density tool 36 may include a photon source 60, such as an x-ray generator, a gamma ray generator, a cesium source, or any other suitable source, that emits photons, such as x-rays, gamma rays, or other high-energy photons. High-energy photons may include photons at an energy sufficient to cause at least a portion of the photons to scatter off elements of the geological formation 12 (e.g., Compton scattering) and to be detected by a detector 64 and a detector 66 after depositing some or all of their energy in the detection medium 68 or 74 respectively.

Between the geological formation 12 and the formation density tool 36, a layer of mud cake 62 may form along the wall of the borehole. In the illustrated embodiment, the photon source 60 emits the photons such that at least some of the photons enter the geological formation 12 (e.g., through the mud cake 62 and/or the borehole fluid 23). At least some of those photons may interact with the geological formation 12 (e.g., scatter) and scatter toward a short-spaced detector 64 (e.g., gamma ray detector, x-ray detector, etc.) and/or a long-spaced detector 66 (e.g., gamma ray detector, x-ray detector, etc.) located farther from the photon source 60 than the short-spaced detector 64. While these are referred to as short-spaced detector 64 and long-spaced detector 66 in the illustrated embodiment, the formation density tool 36 may include additional detectors at the same or different axial positions from the source, such as a second short-spaced detector 80 or a second long spaced detector 86. While in the displayed embodiment, all the detectors are oriented at the same azimuth in a plane perpendicular to the axis of the tool, they may have different axial orientation, e.g. two short spaced detectors could be at the same axial position next to each other and point to different azimuths.

Each short-spaced and long-spaced detector 64 and 66 may include a scintillator 68 and 74, respectively, that absorbs the photons and emits light based on the energy of the absorbed photons. For example, each bunch of emission of lights after photon deposits an energy in the detector may count as a detected photon (e.g., thereby adding one to a count rate of the detector). Further, each short-spaced and long-spaced detector 64 and 66 may include a photomultiplier 70 and 76, respectively, operatively coupled to the respective scintillator 68 and 74 to detect the light emitted by the respective scintillator 68 and 74. Each photomultiplier 70 and 76 may output an electrical signal from the detected light of the scintillator to a respective detection circuit 72 and 78. As mentioned above, the processing of the electrical signals from the photomultiplier 70 and 76 may be performed within the detection circuit 72 and 78, respectively, or in the data processing system 44 at the surface 16 (e.g., as the data 40). As such, each detection circuit 72 and 78 may include hardware similar to the data processing system 44 (e.g., processor 46, memory 48, storage 50, etc.). In some embodiments, the detection circuit 72 and 78 may be communicatively coupled to the data processing system 44 to communicate the data 40 related to the electrical signals indicative of the detected photons.

As described below, the short-spaced detector 64 may be configured to provide spectral information (e.g., a first pulse count scheme) regarding detected photons, and the long-spaced detector 66 may be configured to provide a total count rate (e.g., a second pulse counting scheme different from the first pulse counting scheme) of high-energy photons. That is, the short-spaced detector 64 may provide spectral information indicative of an energy level of the high-energy photons received at the short-spaced detector 64. Further, the long-spaced detector 66 may provide a total count rate (e.g., in photons received by the scintillator 74 and counted per second). While the short-spaced detector 64 is described as the detector configured to provide spectral information and the long-spaced detector 66 is described as the detector to provide the total count rate, the short-spaced detector 64 may be the detector that provides the total count rate and the long-spaced detector 66 may provide spectral information. Moreover, as indicated above, any suitable number of detectors may be used. In some embodiments, a single detector may be used that is configured to provide spectral information when operating in a first mode, and provide total count rate when operating in a second mode. The first and second modes can be operated alternatively or in any combination of sequences. All such embodiments and variations are considered within the scope of the current disclosure.

Figure 3:
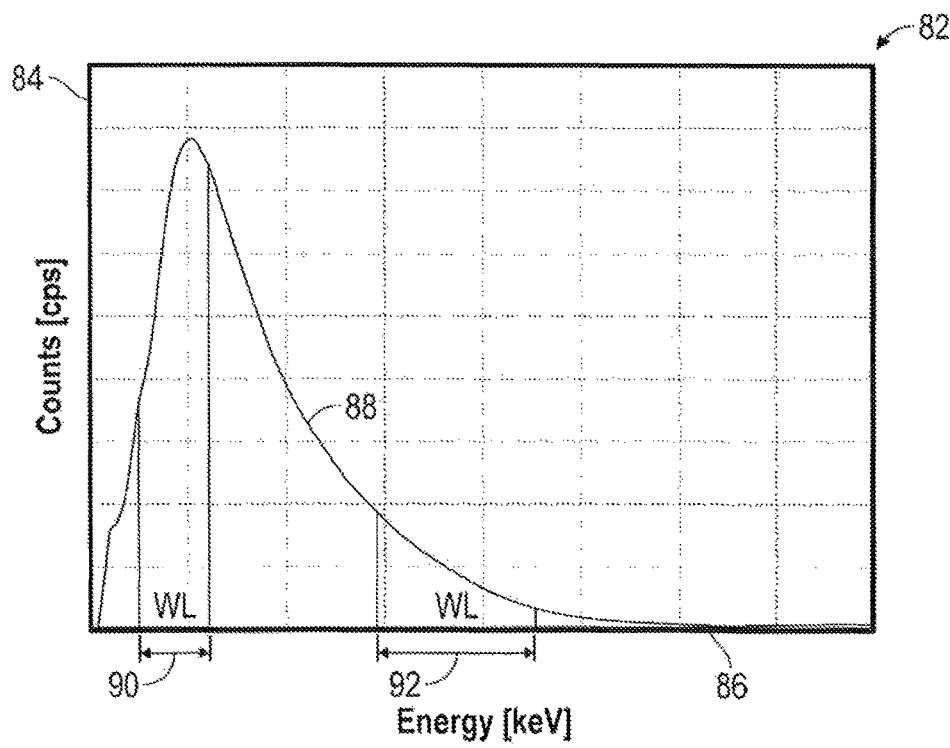
FIG. 3 is a histogram of data received by the first detector of FIG. 2 having a low energy window and a high-energy window to correct for lithology effects in monosensor densities that are used to perform a spine-and-ribs method of analysis, in accordance with an embodiment.
Figure 4:
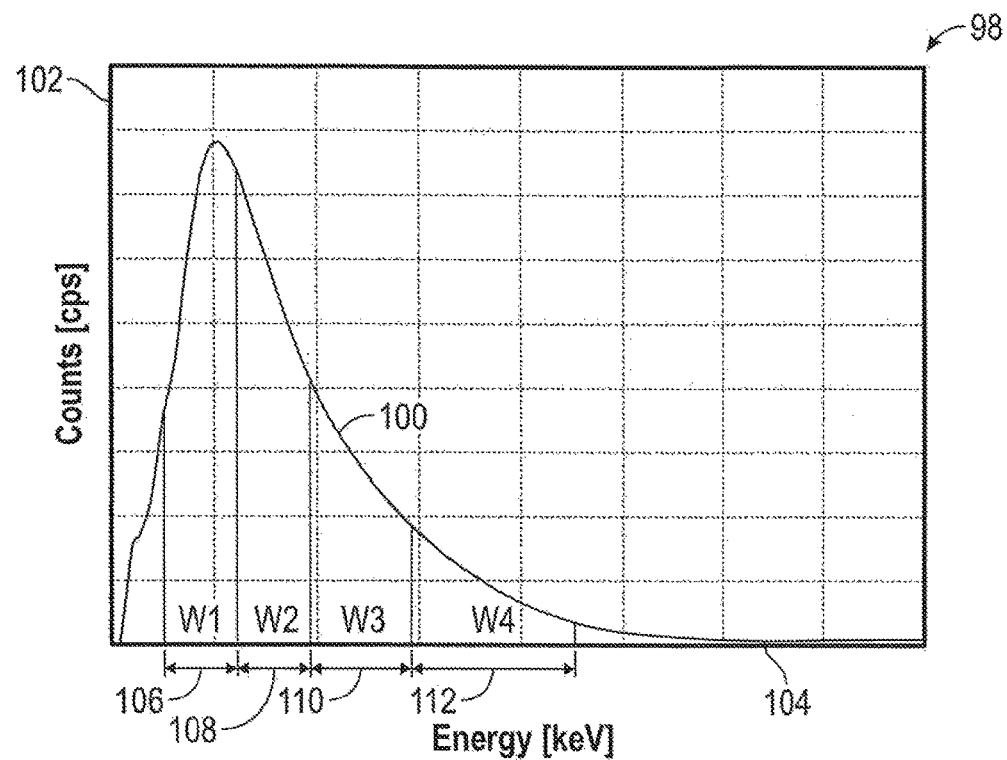
FIG. 4 is a histogram of data received by the first detector of FIG. 2 having a set of windows which are used to perform an inversion algorithm, in accordance with an embodiment.
Figure 5:
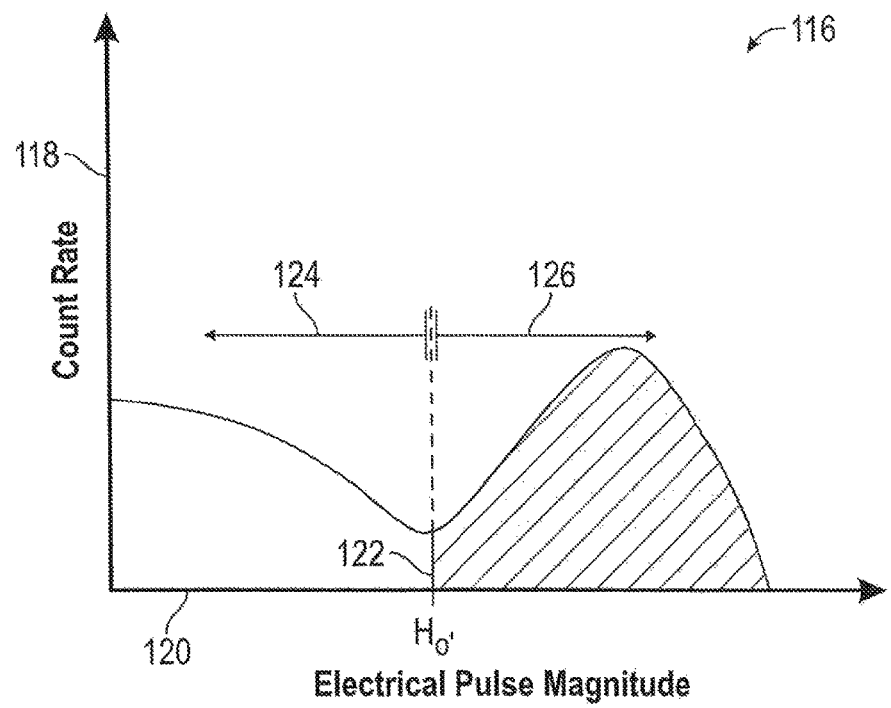
FIG. 5 is a graph of data received by the second detector of FIG. 2 having a set discrimination level to minimize the sensitivity of the total count rate to variations in detector gain, in accordance with an embodiment.

FIG. 3 shows a histogram 82 of spectral information 88 that may be provided by the short-spaced detector 64. While histograms are shown in FIGS. 3-5, these histograms are meant to be illustrative only, and the short-spaced detector 64 and/or the data processing system 44 may process the data 40 without generating the histograms. In certain embodiments, the histograms may be displayed on the display 52. For example, the processor may be configured to provide the physical properties on the display 52. The short-spaced detector 64 may be configured to provide the spectral information 88 indicative of a count rate of photons 84 (e.g., in counts per second (CPS)) with respect to energy 86 (e.g., in kilo electron Volts (keV)) based on the electrical signals received from the photomultiplier 70, thereby based on the photons absorbed by the scintillator 68.

In one embodiment, the processor 46 may split the detected photons from the emitted light of the scintillators 68 and 74 into various energy windows. That is, the processor 46 may divide the spectral information 88 into energy windows of the received high-energy photons based on the energy of the detected photons. The processor 46 may determine a count rate of photons received by the short-spaced detector 64 that have an energy level within a low energy window 90 and/or a high-energy window 92, higher than the low energy window 90. For example, the processor 46 may count a number of photons per second having an energy between 50 keV and 125 keV as a low window count rate and count a number of photons per second having an energy level between 300 keV and 400 keV as a high window count rate. The count rate of photons received in the low energy window 90 and/or the high-energy window 92 may depend on the physical characteristics of the geological formation 12. For instance, the count rate of photons of the low energy window 90 may depend more heavily on lithology effects, characterized by the photoelectric factor (PEF), of the geological formation 12. That is, the lithology effects (e.g., the effect of the effective atomic number of the medium) may be indicative of the type of rock of the geological formation 12. Conversely, the count rate of photons of the high-energy window 92 may depend more heavily on the density of the geological formation 12 than the count rate of the low energy window 90.

The varying sensitivities of photoelectric absorption of the low energy window 90 and the high-energy window 92 may be utilized in a spine and ribs method of analysis to compensate for mud cake present on the borehole and/or standoff. In a spine and ribs method of analysis, the processor 46 may select a combination of count rates of photons from the low energy window 90 and the high-energy window 92 to reduce the PEF dependence of the geological formation 12 and determine a lithology independent monosensor density. That is, because the high-energy window 92 depends more on density than the low energy window 90, and the low energy window 90 depends more on lithology than the high-energy window 92, the processor 46 may determine the formation density independent of the lithology (i.e., composition). The processor 46 may determine a monosensor density in which the formation density is independent of the lithology and may assume certain conditions. For example, the monosensor density may be a density of the geological formation 12 without the mud cake 62 and/or standoff. Similarly, processor 46 may use low energy window 90 of one detector and total counts of another detector to determine second monosensor density. In some embodiments, the processor 46 may use an apparent PEF determined from the low and high energy windows of one detector and the total counts of another detector to determine a second monosensor density. It is also possible to use both a low energy window 90 and an apparent PEF determined from a low energy and a high energy window of one detector ant total counts from another detector to determine a second monosensor density. The total counts of long spaced detector depend less on formation PEF than the low energy window 90 of the short spaced detector. Because the two monosensor densities have different dependence on mud cake 62 and/or standoff, the processor 46 can use spine and ribs analysis to determine physical characteristics of the geological formation 12 that account for mud cake 62 and/or standoff.

The processor 46 may determine the physical characteristics of the geological formation 12 based on the detected count rates using, for example, an inversion method. In the inversion method of analysis, the processor 46 utilizes a model or a system of equations that describe one or more relationships between the five or more inputs and the five properties underlying the inversion (e.g. a forward model). The five properties may be formation density, formation PEF, mud cake thickness, mud cake density and mud cake PEF for an open hole; or a formation density, a formation photoelectric factor (PEF), a casing thickness, a cement thickness, a cement density, and a cement photoelectric factor (PEF) for a cased hole. While the five or more inputs may be a total detector count rate and 4 count rates from different energy windows in a detector as explained below. If more than two detectors are present additional inputs of total count rate of energy window count rates may be added. That is, the processor 46 may determine an initial approximation of five properties based on the five or more inputs.

While the above description indicates the determination of five properties, the number of properties may be smaller or larger. For example, if a certain property such as a borehole fluid density and PEF is known, there is no need to solve for it and the number of independent variable will only be three. In other situations, such as cased hole density logging, there may be more unknowns and a need to solve for more or different properties.

Then, the processor 46 may compare the detected count rates (e.g., from the short-spaced detector 64 and long-spaced detector 66) with the initial approximation based on an initial set of estimated parameters. From that comparison, the processor 46 may iteratively adjust the estimated physical characteristics of the geological formation 12, the borehole fluid 23 and the mud cake 62 and/or borehole fluid 23 in the model to determine a closer approximation of the formation properties. In this manner, the processor 46 may determine a minimum difference between the detected count rates and count rates of the model to provide the physical characteristics. While this is meant to give an explanation of how an inversion method may be performed, in other embodiments, any suitable method including any suitable steps may be used to determine physical characteristics of the geological formation 12 from the detected count rates of the short-spaced detector 64, the long-spaced detector 66, and any other suitable characteristics. While the above process is described as an inversion, other approaches such as linear programming or neural networks for example may be used.

FIG. 4 shows another graph 98 of spectral information 100 that may be provided by the short-spaced detector 64 of a count rate of photons 102 (e.g., in CPS) with respect to energy 104 (e.g., in keV). For example, to perform the inversion operation discussed above, the processor 46 may divide the spectral information 100 of the received high-energy photons into a first energy window 106, a second energy window 108, a third energy window 110, and a fourth energy window 112. Each of the energy windows 106, 108, 110, and 112 may depend on lithology in a different manner similar to the low energy and high-energy windows 90 and 92 of the spine and ribs analysis. For example, the count rate of photons received in the first energy window 106 may depend more on lithology of the geological formation 12 than the count rate of photons received in the second energy window 108, and the count rate of photons received in the second energy window 108 may depend more on lithology of the geological formation 12 than the count rate of photons received in the third energy window 110, and so on. Conversely, the count rate of photons received in the fourth energy window 112 may depend more on density of the geological formation 12 than the third energy window 110, and the count rate of photons received in the third energy window 110 may depend more on density of the geological formation 12 than the count rate of photons received in the second energy window 108, and so on.

The processor 46 may obtain the count rate of photons in the first window 106, the second window 108, the third window 110, and the fourth window 112 (e.g., window counts) as well as a total count rate from the long-spaced detector 66. The processor 46 may then determine, via for example the inversion method, physical characteristics of the geological formation 12 based on the window counts and the total count rate.

In some embodiments, the processor 46 may determine a number of physical characteristics corresponding to the number of (e.g., substantially independent) inputs (e.g., the window counts and the total count rate). In the illustrated embodiment, there may be four window count rates and a total count rate, or five inputs, and the processor 46 may determine, via the inversion method, five physical characteristics, such as a formation density, a formation photoelectric factor (PEF), a mud cake thickness, a mud cake density, and a mud cake PEF, based on the inputs. For instance, the inversion method may determine that a mud cake 62 of some thickness may be in front of a large (e.g., infinitely large) geological formation 12.

In some embodiments, the processor is configured to determine one or more of a formation density, a formation photoelectric factor (PEF), a mud cake thickness, a mud cake density, and a mud cake PEF based on one or more window counts and the total count rate obtained from an open hole. In some embodiments, the processor is configured to determine one or more of a formation density, a formation photoelectric factor (PEF), a casing thickness, a cement thickness, a cement density, and a cement photoelectric factor based on one or more window counts and the total count rate obtained from a cased hole.

In some embodiments, it may be necessary to include an additional independent input so that the number of unknown physical characteristics is not larger than the number of independent inputs. If the number of independent inputs equals or exceeds the number of unknowns, then the processor 46 may determine, for example via an inversion method, the physical characteristics of the geological formation 12 based on the window counts from the spectral information, as well as utilizing the total count rate from the long-spaced detector 66 as the additional independent input. As an example, the processor 46 may determine formation density, formation PEF, mud cake thickness, mud cake density, and mud cake PEF (e.g., five physical characteristics) based on the four window counts as well as an additional independent input from the total count rate (e.g., five independent inputs).

When counting photons, the processor 46 may add counts only when photons received are above some threshold energy level. FIG. 5 is a graph 116 that shows the count rate of photons 118 with respect to electrical pulse magnitude 120. The processor 46 may determine each count of the total count rate based on whether pulses detected by the long-spaced detector 66 exceed a discrimination level 122. That is, the processor 46 may count each pulse having an electrical signal with an electrical pulse magnitude 120 (e.g., voltage or current) greater than the discrimination level 122 to determine each count of the total count rate 118. The discrimination level 122 may correspond to an electrical pulse magnitude 120 in which the detected pulse from the photomultiplier 76 is more likely a high-energy photon (e.g., in direction 126 from the discrimination level 122) than noise (e.g., in direction 124 from the discrimination level 122).

Figure 6:
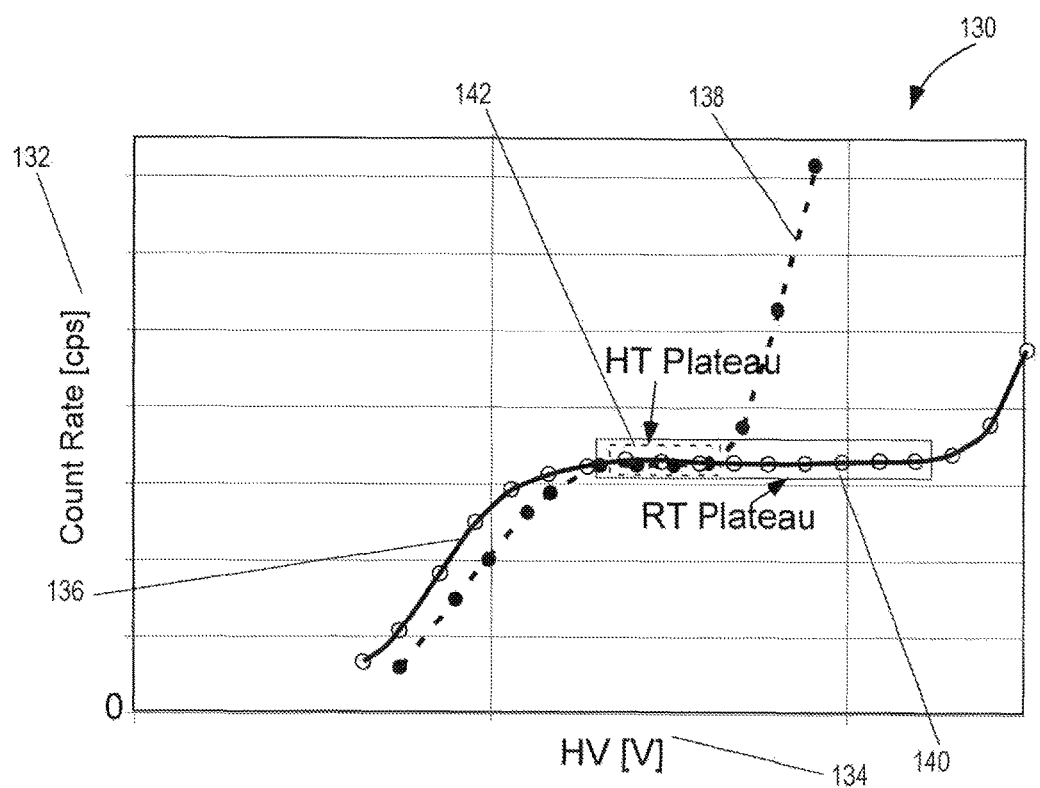
FIG. 6 is a graph of data received by the second detector of FIG. 2 having total count rate as a function of operating voltage where the count rate remains stable across a certain range of operating voltages (e.g., plateau), in accordance with an embodiment.

FIG. 6 shows another graph 130 of a count rate of photons 132 with respect to photomultiplier high voltages (HV) 134 of photons detected by the long-spaced detector 66. Further, the graph 130 shows a first plot 136 of count rates of photons detected in a room temperature (RT) setting, and a second plot 138 of count rates of photons detected at high temperature (HT) setting. Simple counting significantly reduces the need for accurate gain regulation, which can be illustrated with the principle of plateau mode operation as shown in FIG. 6. The discrimination level 122 and photomultiplier HV are fixed at particular values (e.g., via characterization) so that the total count rate is substantially insensitive to variations in detector gain. The first plot 136 may include a longer plateau region indicated by the box 140 where the count rate is approximately stable than the shorter plateau region indicated by the dashed box 142 of the second plot 138 due to the sensitivity to differences in temperature at the detector. Both the discrimination level 122 and detector HV could be adjusted to meet the required accuracy of the density measurement. For example, the discriminator level could be adjusted as a predetermined function of temperature. In yet another approach a correction of the gain may be possible based on a spectral feature that has only a small variability with temperature. Such a feature could be the backscatter peak, the position of which may be affected to some extent by lithology, mud cake or casing for example, but the variation of which may be small enough to allow a coarse spectral gain regulation and/or an adjustment in the discriminator threshold.

The short-spaced detector 64 and/or long-spaced detector 66 may be characterized (e.g., calibrated) through experimentation, simulation, or testing, to receive certain count rates in a wide range of geological formations and conditions. For example, the long-spaced detector 66 may be characterized to detect a count rate in a plateau region where the count rate and the operating voltage are controlled such that the long-spaced detector operates in the plateau region 140 and plateau region 142 where the count rate of photons is approximately stable with respect to various operating characteristics, such as temperature, operating voltage, and the like. Because the long-spaced detector 66 may be characterized to operate in the plateau region and therefore has approximately stable count rate of photons with respect to the operating characteristics, the total count rate from the long-spaced detector 66 is insensitive to variations in detector gain, reducing or eliminating the use of gain regulation. The stable count rate of photons detected in the plateau region provides an independent input, along with the additional spectral information inputs from the short-spaced detector 64, for the inversion method to determine the physical properties of the geological formation 12 without using gain regulation. Further, in some embodiments, the processor 46 may correct the total count rate based on the spectral information received via the short-spaced detector 64. For example, the PEF information from the short-spaced detector 64 can be used to correct the total count rate of the long-spaced detector 66, allowing for an accurate determination of long-spaced monosensor density. The PEF information of the geological formation is based on the low energy window count rates and high-energy window count rates, respectively, of the short-spaced detector 64. The formation density is based on compensation of long-spaced monosensor density by short-spaced monosensor density, spine and ribs method, to account for any or some thickness of mud cake 62 for a more accurate formation density determination. In some embodiments, because the plateau may be modified based on the temperature affecting the accuracy of the gain regulation (e.g., on the low energy cutoff or some crude spectral shape factor), the long-spaced detector 66 may have an operating voltage that is modified based on a temperature measurement from an external source (e.g., a board in the formation density tool or another tool). Further, the long-spaced detector 66 may have an operating voltage that is modified based on a pulse shape parameter from the crystal of the detector. In yet another approach, a correction of the gain may be possible based on a spectral feature that has only a small variability with temperature. Such a feature could be the backscatter peak, the position of which may be affected to some extent by lithology, mud cake or casing for example, but the variation of which may be small enough to allow a coarse spectral gain regulation and/or an adjustment in the discriminator threshold.

Figure 7:
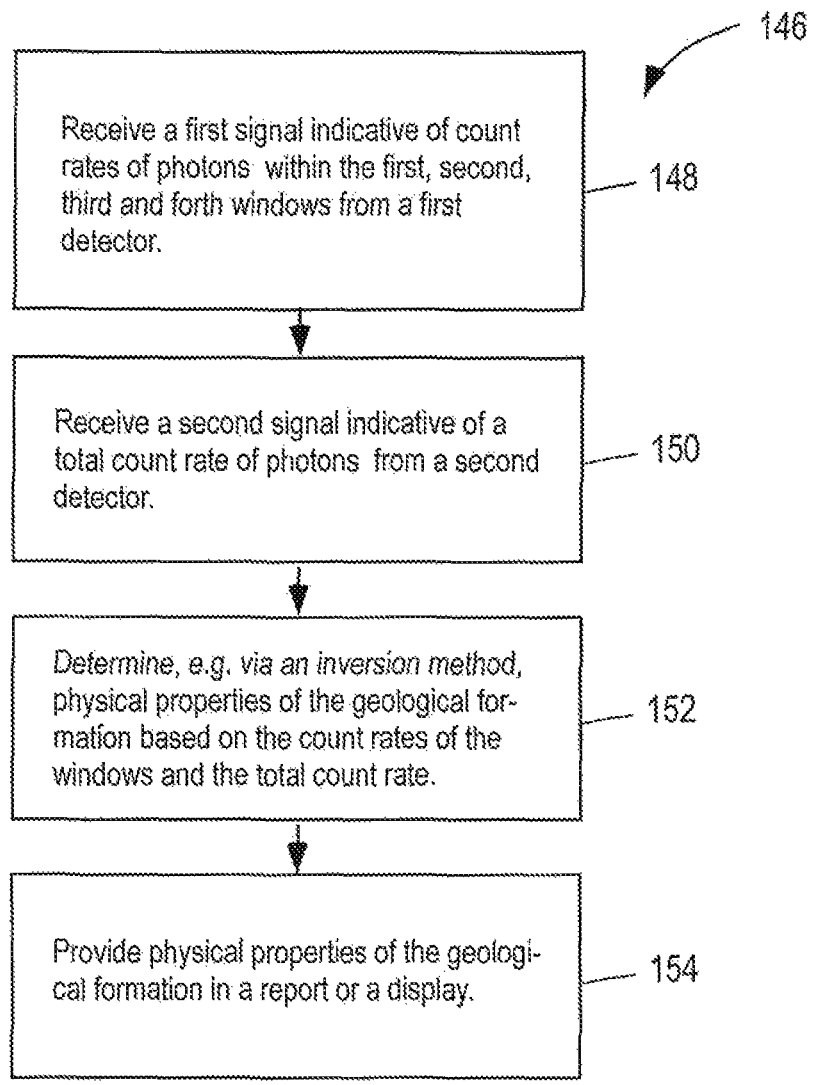
FIG. 7 is a block diagram of a method performed by the formation detection system of FIG. 1 to provide a report of the physical properties of a geological formation via an inversion algorithm based on spectral information and total count rate, in accordance with an embodiment.

FIG. 7 shows a flow diagram 146 of a process 146 performed by the processor 46 to provide physical properties of the geological formation 12 in the report 54. At block 148, the processor 46 may receive data indicative of count rates of photons within the first window 106, the second window 108, the third window 110, and the fourth window 112 from the short-spaced detector 64. The count rates of photons within the windows may provide spectral information regarding the geological formation 12. At block 150, the processor 46 may receive data indicative of the total count rate of photons from the long-spaced detector 66. Further, the processor 46 may correct the total count rate from the long-spaced detector 66 based on the spectral information to correct for PEF.

At block 152, the processor 46 may then determine, for example via an inversion method, the physical properties of a geological formation 12 based on the window counts and the total count rate. Further, the total count rate may enable the processor 46 to determine physical properties of the geological formation 12 without the use of gain regulation from a radioactive source by operating in a plateau region where the count rate is stable at varying operating voltages.

Usually, the long-spaced detector 66 may be more sensitive to the formation density than to the lithology. The short-spaced detector 64 may be used for compensation, either explicitly or implicitly. In addition, the short spaced detectors may be the primary detectors for the PEF measurement. The ratio of the count rates in the low and high-energy windows may be sensitive to PEF. A spine-and-ribs algorithm defines the formation density, while PEF is determined separately as a function of the window count rate ratio in one of the detectors. As such, the long-spaced detector 66 may be used effectively in the determination of formation properties even when used in total count rate mode. This total count rate effectively determines a formation density distorted by lithology effects. The short-spaced detector may provide the window counts and the PEF of the formation. The processor 46 may then use the information from the short-spaced detector 64 to correct the density that is effectively measured by long-spaced detectors. A detector operating in spectral mode can be used as a detector operating in plateau mode, if necessary. The forward model for total count prediction can be just a sum of forward models for individual windows. If the formation density tool has a sufficient number of detectors with at least one detector characterized to provide spectral information, enough independent observables (e.g., at least five, but more is better) can solve for the five geological formation and mud cake properties in a two-layer problem.

In block 154, the processor 46 may generate data indicative of the physical properties to be output in the report 54, the display 52, or the like. The report 54 may enable an operator to adjust one or more parameters (e.g., drill bit 20) based on the physical properties of the geological formation 12 to improve drilling operations. By having the formation density tool include a first detector that detects spectral information and a second detector that provides a total count rate, the formation density tool may determine an accurate (e.g., at least 0.025 g/cc, better than 0.01 g/cc accuracy, between 0.01 g/cc and 0.025 g/cc accuracy, etc.) formation density.

As such, the technical effects of the present disclosure include providing physical properties of a geological formation. In some embodiments, the physical properties may be provided in a report that indicates a formation density, a formation photoelectric factor (PEF), a mud cake thickness, a mud cake density, and a mud cake PEF. A formation detection system may include a formation detection tool that has a first detector configured to provide spectral information of a geological formation and a second detector configured to provide a total count rate of photons detected. An operating voltage and pulse processing scheme may be chosen for at least one of the detectors so that the total count rate in the detector is insensitive to gain variation. When at least one detector in the tool also provides spectral information, or multiple discrimination levels, that detector will provide lithology information. The inversion method of analysis may then be used to determine the PEF corrected formation density, with the detector operating in total count-rate mode providing an independent piece of information. The method of operating the formation density tool may be useful when an additional detector (e.g. long spaced) is used to provide a deeper reading into the formation, for which a detector delivering spectral information is not used. A data processing system may receive the spectral information and the count rate and provide the report indicative of the physical characteristics of the geological formation.

The specific embodiments described above have been shown by way of example, and it should be understood that these embodiments may be susceptible to various modifications and forms. For example, although the foregoing embodiments are described in the context of a photon generating formation density tool (e.g. gamma-ray or X-ray density tool), other formation density tool (e.g. neutron gamma density tool) may employ some or all aspects of the current disclosure. Moreover, in some embodiments, even a non-density tool (e.g. such as a porosity tool, a hydrogen index too, a spectroscopy tool, etc.) may incorporate some or all features of the current disclosure. It should be further understood that the claims are not intended to be limited to the particular forms disclosed, but rather to cover modifications, equivalents, and alternatives falling within the spirit and scope of this disclosure.

What is claimed is:

1. A well logging system comprising:
   a formation density tool;
   a processor operatively coupled to the formation density tool and configured to:
      receive a first dataset indicative of spectral information regarding photons scattered off a geological formation and received from a first detector of the formation density tool;
      receive a second dataset indicative of a total count rate of photons scattered off the geological formation and received from a second detector of the formation density tool;
      use the total count rate of photons in gain regulation; and
      determine physical characteristics of the geological formation based on the spectral information and the total count rate.

2. The system of claim 1, wherein the processor is configured to determine the physical characteristics via an inversion method using a plurality of portions of the spectral information, and the total count rate.

3. The system of claim 1, wherein the processor is configured to use total count rate of one or more detectors detector without regulation by radioactive stabilization sources.

4. The system of claim 1, wherein the processor is configured to provide a borehole corrected density measurement with an accuracy of at least 0.025 g/cc.

5. The system of claim 1, wherein the processor is configured to determine one or more of a formation density, a formation photoelectric factor (PEF), a mud cake thickness, a mud cake density, and a mud cake PEF based on one or more window counts and the total count rate obtained from an open hole.

6. The system of claim 1, wherein the processor is configured to determine one or more of a formation density, a formation photoelectric factor (PEF), a casing thickness, a cement thickness, a cement density, and a cement photoelectric factor based on one or more window counts and the total count rate obtained from a cased hole.

7. The system of claim 1, wherein the processor is configured to obtain a count rate for each of a plurality of windows associated with the spectral information, wherein each count rate of each of the plurality of windows comprise a rate of photons detected by the first detector, wherein each of the plurality of windows corresponds to a range of energy.

8. The system of claim 1, wherein the processor is configured to determine the total count rate based on photons acquired by the second detector having an energy level greater than a value.

9. A system, comprising:
   a formation density tool configured to detect photons output by a photon source, wherein the detected photons are used to determine physical characteristics of a geological formation, wherein the formation density tool comprises:
      a first detector configured to acquire spectral information of a first portion of the photons scattered off the geological formation and received by the first detector;
      a second detector configured to provide a total count rate of a second portion of the photons scattered off the geological formation and received by the second detector; and
      a processor configured to use the total count rate of photons in gain regulation.

10. The system of claim 9, comprising the photon source configured to emit the photons towards the geological formation, wherein the first detector is configured to be disposed in a first position from the photon source and the second detector is configured to be disposed in a second position further away in distance from the photon source than the first detector.

11. The system of claim 9, wherein the second detector is configured to acquire the total count rate by operating in a plateau region with a fixed operating voltage.

12. The system of claim 9, wherein each of the second portion of the photons comprises an energy level greater than a discrimination level.

13. The system of claim 9, comprising a processor configured to adjust the total count rate based on the spectral information.

14. The system of claim 9, wherein the formation density tool comprises a stabilization source to perform gain regulation on the first detector to calibrate detected photon energy in the spectral information.

15. A method, comprising:
   receiving, via a processor, spectral information regarding photons scattered off a geological formation and received from a first detector of a formation density tool;
   receiving, via the processor, a total count rate of photons scattered off the geological formation and detected by a second detector of the formation density tool;
   using the total count rate of photons in gain regulation; and
   determining, via the processor, physical characteristics of the geological formation based on the spectral information and the total count rate.

16. The method of claim 15, comprising splitting, via the processor, the spectral information into a plurality of windows, wherein each window of the plurality of windows comprises a count rate of photons within a respective range of energy.

17. The method of claim 15, comprising determining, via the processor, one or more of a formation density, a formation photoelectric factor (PEF), a mud cake thickness, a mud cake density, a mud cake PEF, a casing thickness, a cement thickness, a cement density, and a cement photoelectric factor based on the spectral information and the total count rate.

18. The method of claim 15, comprising determining the physical characteristics via an inversion method, a plurality of portions of the spectral information, and the total count rate.

19. The method of claim 18, wherein determining the physical characteristics via the inversion method comprises:

creating a model comprising one or more equations that relate the spectral information and the total count rate to the physical characteristics of the geological formation;

determining a minimum difference between the spectral information and the total count rates and the model to determine the physical characteristics of the geological formation.

20. The method of claim 15, comprising adjusting the total count rate based on the spectral information.

* * * * *